(12) United States Patent
Goel et al.

(10) Patent No.: US 10,019,495 B2
(45) Date of Patent: Jul. 10, 2018

(54) KNOWLEDGE PANEL

(71) Applicant: Google LLC, Mountain View, CA (US)

(72) Inventors: Kavi J. Goel, San Francisco, CA (US); Shashidhar A. Thakur, Saratoga, CA (US); Jared L. Levy, Mountain View, CA (US); Christina R. Dhanaraj, Sunnyvale, CA (US); Eyal Carmi, Jersey City, NJ (US); John R. Provine, Berkeley, CA (US); Emily Kay Moxley, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/271,631

(22) Filed: Sep. 21, 2016

(65) Prior Publication Data

US 2017/0011102 A1    Jan. 12, 2017

Related U.S. Application Data

(63) Continuation of application No. 13/840,568, filed on Mar. 15, 2013, now Pat. No. 9,477,711.

(60) Provisional application No. 61/648,031, filed on May 16, 2012.

(51) Int. Cl.
  *G06F 7/00*        (2006.01)
  *G06F 17/30*       (2006.01)

(52) U.S. Cl.
  CPC .... *G06F 17/30554* (2013.01); *G06F 17/3053* (2013.01); *G06F 17/30598* (2013.01); *G06F 17/30696* (2013.01); *G06F 17/30864* (2013.01); *G06F 17/30867* (2013.01)

(58) Field of Classification Search
  CPC .................................................. G06F 17/30867
  See application file for complete search history.

(56) References Cited

U.S. PATENT DOCUMENTS

| | | | |
|---|---|---|---|
| 6,185,558 B1 * | 2/2001 | Bowman | G06F 17/30646 705/37 |
| 6,876,997 B1 | 4/2005 | Rorex et al. | |
| 8,032,519 B2 | 10/2011 | Groeneveld et al. | |
| 8,285,699 B2 | 10/2012 | Groeneveld et al. | |
| 2002/0038299 A1 | 3/2002 | Zernik et al. | |
| 2003/0212673 A1 * | 11/2003 | Kadayam | G06F 17/30864 |

(Continued)

FOREIGN PATENT DOCUMENTS

CN            100481077         4/2009

OTHER PUBLICATIONS

Office Action in Chinese Application No. 201380037213.5, dated Mar. 27, 2017, 14 pages.

(Continued)

*Primary Examiner* — Charles Lu
(74) *Attorney, Agent, or Firm* — Fish & Richardson P.C.

(57) ABSTRACT

Methods, systems, and apparatus, including computer programs encoded on a computer storage medium, for providing knowledge panels. In one aspect, a method includes determining an entity that is referenced by a received search query. Content items relevant to the entity are identified. A set of knowledge modules is selected for presentation in a knowledge panel for the entity. The knowledge panel can be a portion of a search results page in which knowledge modules are presented. Data that causes the knowledge modules to be presented in the knowledge panel is provided to a user device.

20 Claims, 6 Drawing Sheets

(56) References Cited

U.S. PATENT DOCUMENTS

| | | |
|---|---|---|
| 2006/0020596 A1* | 1/2006 | Liu .................. G06F 17/30867 |
| 2009/0089312 A1 | 9/2009 | Costello et al. |
| 2009/0241018 A1 | 9/2009 | Costello et al. |
| 2010/0115396 A1 | 5/2010 | Byron et al. |
| 2011/0225152 A1* | 9/2011 | Beaudreau ........ G06F 17/30867 707/728 |
| 2012/0059838 A1* | 3/2012 | Berntson ........... G06F 17/30864 707/759 |
| 2013/0311458 A1 | 11/2013 | Goel et al. |

OTHER PUBLICATIONS

Office Action issued in Australian Application No. 2013263220, dated Sep. 7, 2017, 3 pages.

* cited by examiner

KNOWLEDGE PANEL

CROSS-REFERENCE TO RELATED APPLICATIONS

This application is a continuation application of, and claims priority to, U.S. patent application Ser. No. 13/840,568, titled "KNOWLEDGE PANEL," filed on Mar. 15, 2013, which application claims the benefit under 35 U.S.C. § 119(e) of U.S. Patent Application No. 61/648,031, entitled "KNOWLEDGE PANEL," filed May 16, 2012. The disclosure of each of the foregoing applications is incorporated herein by reference.

BACKGROUND

This specification relates to digital information retrieval and presentation.

The Internet provides access to a wide variety of resources such as video or audio files, web pages for particular subjects, book articles, or news articles. A search system can identify resources in response to a text search query that includes one or more search phrases (i.e., one or more words) or non-text input such as audio, images, or video that is input as a search query. The search system ranks the resources based on measures of relevance of the resources to the search query and on measures of quality of the resources. In turn, the search system selects a quantity of the ranked resources and provides search results that link to the selected resources. The search results are typically ordered for viewing according to the rank of the resource to which the search result links, and provided in a search results page.

Users of search systems are often searching for data related to a particular entity, such as a person, place, landmark, movie, or other work of art. To access data that satisfies a user's informational need, the user may have to click one or more search results and scroll through or search the web pages (or other resources) that are linked to by the search results in order to find the desired data.

SUMMARY

In general, one innovative aspect of the subject matter described in this specification can be embodied in methods that include the actions of identifying an entity that is referenced by a received search query; identifying content items that have been identified as relevant to the entity; for each of the identified content items, identifying: a content category to which the content item has been classified; and a rank score for the content item, the rank score being indicative of the relevance of the content item to the entity; selecting a set of knowledge modules to be presented in a knowledge panel for the entity, the knowledge panel being a portion of a search results page in which the set of knowledge modules are presented, the set of knowledge modules including at least two different knowledge module types, the selection being based, at least in part on, the rank scores and identified content categories for the content items; and providing, for a user device, data that cause the user device to present the set of knowledge modules in the knowledge panel, the knowledge panel being presented with the search results page for the received search query, and each knowledge module being presented in a respective knowledge panel location based, at least in part, on the knowledge module types each knowledge module presenting one or more of the identified content items. Other embodiments of this aspect include corresponding systems, apparatus, and computer programs, configured to perform the actions of the methods, encoded on computer storage devices.

These and other embodiments can each optionally include one or more of the following features. Selecting a set of knowledge modules can include determining, for two or more content categories, a preferred module type indicative of a type of knowledge module in which presentation of the content items is preferred; determining that a particular module type is the preferred module type for two of the content categories; and determining that content items for only a first of the two content categories will be presented in the particular module type, the determination being based, in part, on panel constraints that specify a maximum number of the knowledge modules of the particular module type that are allowed to be included in the set of knowledge modules.

Aspects can further include determining that content items for a second of the two identified content categories will be presented in a knowledge module having a module type that is different than the particular module type.

Determining that content items for only a first of the two identified content categories will be presented in the particular module type can include determining that presenting both of the of the two identified content categories in the particular module type will cause a number of the knowledge modules of the particular module type to exceed a maximum number of knowledge modules that are allowed to be of the particular module type; and determining that the content items in the first content category have a higher rank score than the rank score for the content items in the second content category.

Aspects can further include selecting the content items in the first content category for presentation in the particular module type. The selection can be in response to determining that the rank score for the content items in the first content category is greater than the rank score for the content items in the second content category.

Selecting a set of knowledge modules to be presented in a knowledge panel for the entity can include ranking content categories for the content items based on rank scores for the content items that have been classified to the content categories; and selecting a knowledge module for each of the content categories that is included in a highest ranking subset of the content categories.

Aspects can further include: for each selected knowledge module: selecting at least a portion of the content items that have been classified to the content category for which the selected knowledge module was selected; wherein providing data that cause the user device to present the set of knowledge modules in the knowledge panel includes providing data that cause at least a portion of the selected content items to be presented in the selected knowledge panel.

The portion of the content items that are selected for a particular knowledge module can include at least two different content items that are provided by two different publishers.

Aspects can further include selecting, for inclusion in the set of knowledge modules, a related search module; and populating the related search module with related search content items. Each of the related search content items can be content items that initiate a new search in response to user interaction with the related search content item.

Selecting a set of knowledge modules to be presented in the knowledge panel can include selecting the set of knowledge modules based on a number of the content items that have been classified to a particular content category.

Selecting the set of knowledge modules based on a number of the content items that have been classified to a particular content category can include determining that a number of the content items that have been classified as image content items is less than a threshold number of images required to select an image module for inclusion in the set of knowledge modules; and selecting the set of knowledge modules to not include an image module.

Particular embodiments of the subject matter described in this specification can be implemented so as to realize one or more of the following advantages. Knowledge panels are presented in search results pages (or other pages) to provide data regarding particular entities that have been identified as relevant to the search query. Presenting the knowledge panels in the search results page reduces the number of web pages users have to visit in order to obtain information for which the users are searching, thereby reducing the time required for the users to find information that satisfies their informational needs. Knowledge panels include data slots that can be populated with user interface modules that are selected based on the entity or type of entity for which the knowledge panel is being provided, thereby enabling presentation of more complete and/or relevant information about the entity in the knowledge panel.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
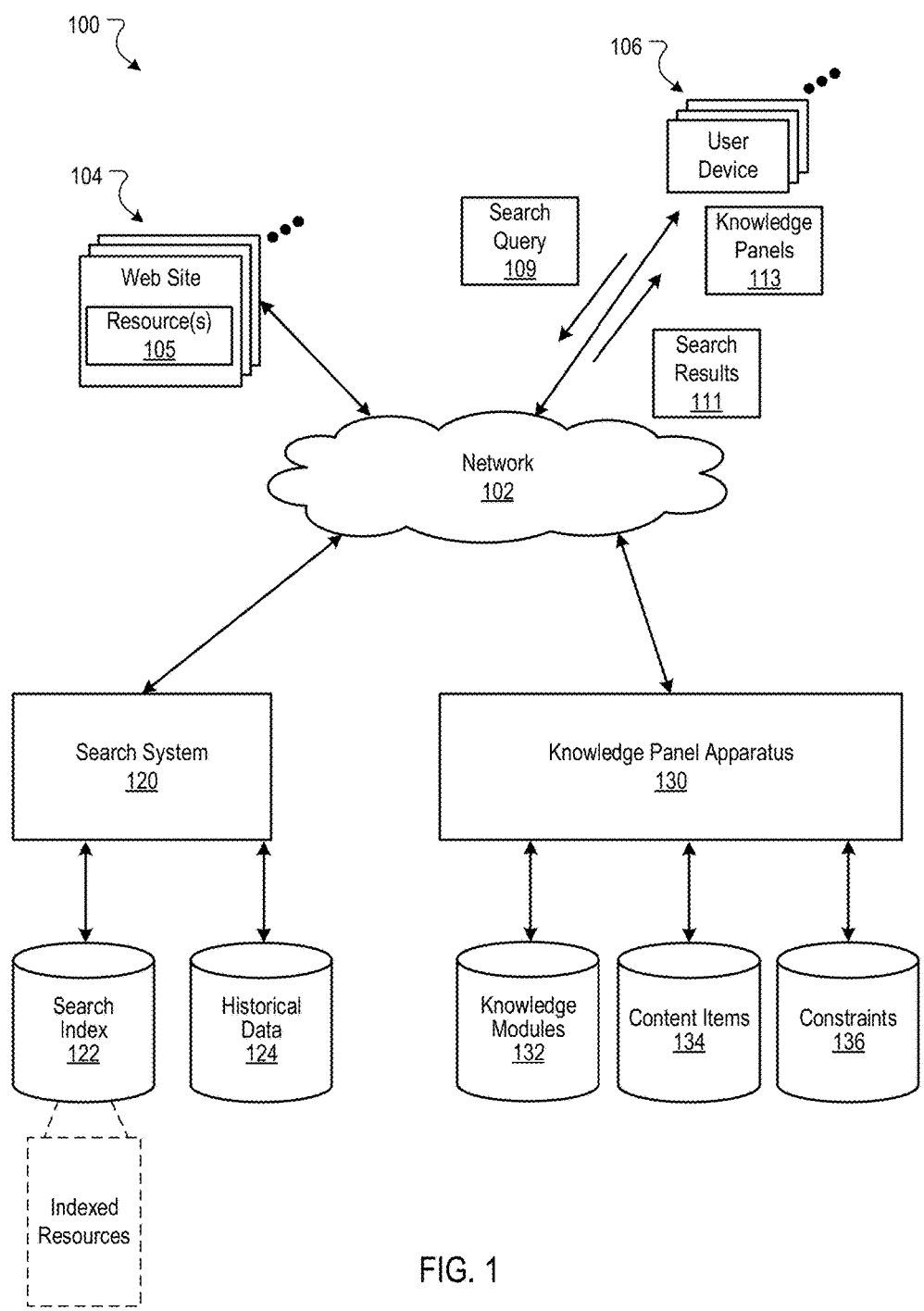
FIG. 1 is a block diagram of an example environment in which a search system provides search services.

A system can provide one or more knowledge panels in response to a received search query. A knowledge panel is a user interface element that provides information related to a particular entity referenced by a search query, such as a person, place, country, landmark, animal, historical event, organization, business, sport team, movie, song, album, work of art, or any other entity. In some implementations, a knowledge panel may provide a summary of information for the entity. For example, a knowledge panel for a singer may include an image of the singer, a description of the singer, one or more facts about the singer, and content that identifies songs and albums recorded by the singer. A knowledge panel for a particular entity may also, or alternatively, include information about other entities that have been identified as related to the particular entity. For example, if the singer referenced above is married to a famous actor, the knowledge panel for the singer may include information about the famous actor and/or include code that causes a search for the famous actor to be initiated in response to a specified user interaction with the knowledge panel.

A knowledge panel may be presented inline or adjacent to other search results for a received query or in place of the other search results. For example, standard search results that provide a link to resources deemed to be responsive to the search query may be presented on one side of a search results page and a knowledge panel may be presented on the other side of the search results page.

As the type of content relevant to a particular entity or type of entity may differ from the content relevant to other entities or types of entities, the knowledge panels can be flexible or modular to allow for presentation of different types of content based on the entity for which the knowledge panel is being generated. In some implementations, knowledge panels include one or more slots or locations in which knowledge modules that are populated with one or more content items can be presented. A knowledge module is a user interface module for presenting one or more content items in a particular format. For example, one type of knowledge module is an image module in which images are presented, and another type of knowledge module is a table module in which data is presented in a tabular format.

The particular knowledge panels and categories or types of content items selected for a knowledge panel can vary based on the entity, or type of entity, for which the knowledge panel is generated. This gives the knowledge panel the flexibility to present, for each entity or each type of entity, the most relevant content items and most relevant categories of content. For example, a particular slot of a knowledge panel for a singer may include a list of songs for the singer, while the same particular slot of a knowledge panel for an author may include images of books written by the author.

Each knowledge module can present one or more content items in a particular data format. For example, one knowledge module may be formatted to present a row of images, while another knowledge module may be formatted to present data in a table format.

Each type of content can have a preferred presentation format. For example, a knowledge module for presenting movies, e.g., in which an actor has played a role, may have a preferred format of images, for example images of movie posters for the movies. By way of another example, a knowledge module for presenting songs performed by a singer may have a preferred formal of a table that lists the songs and optionally additional information.

The system can select knowledge modules to include in a knowledge panel based on the entity, or type of entity, for which the knowledge panel is being generated. The selection of knowledge modules can also be based on characteristics of the content items that have been deemed to be responsive to the received search query, and/or based on one or more content presentation constraints for the knowledge panel. For example, the knowledge panel may be limited to include a maximum number of knowledge modules, and/or to include only a certain number of a particular type of knowledge modules. For example, content presentation constraints for a knowledge panel may specify a maximum number of knowledge modules that can include images. In such an example, some content may be presented using images, while other content may be presented using text, even if the preferred data format for the other content is an image format.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

FIG. 1 is a block diagram of an example environment 100 in which a search system 120 provides search services. The example environment 100 includes a network 102, e.g., a local area network (LAN), wide area network (WAN), the Internet, or a combination of them, connects web sites 104, user devices 106, and the search system 120. The network 102 can be accessed over a wired and/or a wireless communications link. For example, mobile computing devices, such as smartphones can utilize a cellular network to access the network. The environment 100 may include millions of web sites 104 and user devices 106.

A web site 104 is one or more resources 105 associated with a domain name and hosted by one or more servers. An example web site is a collection of web pages formatted in hypertext markup language (HTML) that can contain text, images, multimedia content, and programming elements, e.g., scripts. Each web site 104 is maintained by a publisher, e.g., an entity that manages and/or owns the web site.

A resource 105 is data provided over the network 102 and that is associated with a resource address. Resources 105 that can be provided by a web site 104 include HTML pages, word processing documents, and portable document format (PDF) documents, images, video, and feed sources, to name just a few. The resources 105 can include content, e.g., words, phrases, images and sounds and may include embedded information, e.g., meta information and hyperlinks, and/or embedded instructions, e.g., scripts.

A user device 106 is an electronic device that is capable of requesting and receiving resources 105 over the network 102. Example user devices 106 include personal computers, mobile computing devices, e.g., smartphones and/or tablet computing devices, that can send and receive data over the network 102. As used throughout this document the term mobile computing device ("mobile device") refers to a user device that is configured to communicate over a mobile communications network. A smartphone, (i.e., a phone that is enabled to communicate over the Internet) is an example of a mobile device. A user device 106 typically includes a user application, e.g., a web browser, to facilitate the sending and receiving of data over the network 102.

To facilitate searching of resources 105, the search system 120 identifies the resources 105 by crawling and indexing the resources 105 provided on web sites 104. Data about the resources 105 can be indexed based on the resource to which the data corresponds. The indexed and, optionally, cached copies of the resources 105 are stored in a search index 122.

The user devices 106 submit search queries 109 to the search system 120. In response, the search system 120 accesses the search index 122 to identify resources 105 that are relevant to, e.g., have at least a minimum specified relevance score for, the search query 109. The search system 120 identifies the resources 105, generates search results 111 that identify the resources 105, and returns the search results 111 to the user devices 106. A search result 111 is data generated by the search system 120 that identifies a resource 105 that is responsive to a particular search query, and includes a link to the resource 105. An example search result 111 can include a web page title, a snippet of text or a portion of an image extracted from the web page, and the URL of the web page.

Data for the search queries 109 submitted during user sessions are stored in a data store, such as the historical data store 124. For example, the search system 120 can store received search queries in the historical data store 124.

Selection data specifying actions taken in response to search results 111 provided in response to each search query 109 are also stored in the historical data store 124, for example, by the search system 120. These actions can include whether a search result 111 was selected (e.g., clicked or hovered over with a pointer). The selection data can also include, for each selection of a search result 111, data identifying the search query 109 for which the search result 111 was provided.

The example environment 100 also includes a knowledge panel apparatus 130 communicably coupled to the search system 120 (e.g., directly coupled or coupled over a network such as network 102). The knowledge panel apparatus 130 can generate knowledge panels 113 and provide the knowledge panels 113 in response to a search query 109, for example a search query 109 received by the search system 120. Typically, the search system 120 provides a knowledge panel 113 for queries that reference a particular entity, such as a person. For a search query 109 that references a particular entity, the search system 120 may provide data identifying the entity and/or the search query 109 to the knowledge panel apparatus 130. In turn, the knowledge panel apparatus 130 can identify content items relevant to the entity, select one or more knowledge modules for presenting the content items, and provide the knowledge panel 113 or data for generating the knowledge panel 113 to the search system 120.

Content items are discrete units of content that are inserted into a knowledge panel and/or a knowledge module that is inserted into a knowledge panel. Content items that are inserted into a particular knowledge module and/or knowledge panel can come from disparate sources and/or disparate publishers. For example, different images of a famous singer may be received from several different sources and included in a same knowledge module that is included in a knowledge panel for the famous singer.

The content items for a knowledge panel 113 can include a title for the knowledge panel 113, one or more images, a description of the entity referenced by the knowledge panel, one or more facts about the entity, one or more videos, upcoming events related to the entity, content from a social networking page associated with the entity, and other information or types or categories of content. The categories of content provided in a knowledge panel 113 may be determined based on the entity or the type of entity referenced by the knowledge panel. For example, a knowledge panel for a person may include an image of the person, facts about the person, and references to any public works produced by the person. By way of another example, a knowledge panel for a landmark may include images of the landmark, facts about the landmark, and travel information, such as a map, for a person to travel to the landmark. The categories of content that are included in a knowledge panel can also vary based on the actual entity. For example, a person that has acted in movies and that has also recorded one or more albums may include references to both types of works.

The content items for knowledge panels 113 are stored in a content item data store 134. The content item data store 134 can include, for each content item, a reference to each particular entity that is related to the content item. For example, an image of members of a rock band may include a reference to the rock band itself and a reference to each member of the rock band. When a search query that references the rock band or one of its members is received, the knowledge panel apparatus 130 may select the image for inclusion in a knowledge panel 113 based, in part, on the references.

As noted above, the content items stored in the content item data store 134 can be obtained from multiple resources or multiple publishers. For example, a description for an entity may be obtained from a first resource, such as an online encyclopedia, and an image for the entity may be obtained from a second resource different than the first resource. The knowledge panel apparatus 130 or the search system 120 can identify the content items for the content item data store 134 periodically, for example using an offline process, or at query time.

The content item data store 134 can also include, for each content item, one or more rank scores for the content item relative to one or more entities. In some implementations, the rank score for a content item with respect to an entity is indicative of the relevance of the content item to the entity. For example, a content item having a higher rank score for an entity than the rank score for another content item may be considered more relevant to the entity than the other content item.

In some implementations, the rank score for a content item with respect to an entity is based on the popularity of the content item with respect to the entity. The popularity of content item with respect to an entity may be determined based on historical data for queries directed to the entity. For example, if a large number of search queries have been received by the search system 120 for the age of a particular person and only a small number of queries have been received for the birth place of the particular person, then the age of the person may have a higher rank score for the particular person than the birth place of the particular person.

In some implementations, the popularity of content items with respect to particular entities is based on historical data for search queries received from multiple or all users. In some implementations, the popularity of content items with respect to particular entities is user specific and based on historical data for search queries received from the user. For example, if an individual commonly submits search queries for albums released by bands or singers, then the rank score for albums may be higher than the rank score for songs released by bands or singers even if most users more commonly search for songs rather than albums.

In some implementations, the popularity of content items with respect to particular entities is based on temporal data. For example, a movie starring a particular actor has recently been released or will be released soon, that movie may receive a higher rank score than a movie that was released years ago.

Although different categories of content can be provided for different types of entities and/or different entities within an entity type, the knowledge panels 113 can be configured to provide a recognizable and consistent user interface for users. In some implementations, each knowledge panel 113 can have one or more standard content items. For example, the standard content items can include a title, an image, a description, and one or more facts about the entity for which the knowledge panel is provided.

Each of the standard content items can consistently be located in a same portion of the knowledge panel to provide a consistent user interface across knowledge panels for different types of entities. For example, the image may be located in the top left corner of the knowledge panel and the description and facts may be located to the right of the image. If an entity does not have one of the standard content items, then that content item may be replaced with another content item. For example, if no image is available for an entity, another fact may be provided in place of the image. Note that the particular standard content items are provided above for purpose of example, and that other types of content items can be selected as standard content items.

Each knowledge panel 113 can also include locations or slots for one or more knowledge modules. As noted above, a knowledge module is a user interface module for presenting one or more content items in a particular format. The knowledge modules can include placeholders or other variables that are populated with content items when a knowledge panel that includes the knowledge module is generated. Each knowledge module can be stored in a knowledge modules data store 132.

One example knowledge module is an image module. An image module presents one or more images, for example in a row or column. An image module can be used to present images of a landmark or location, images of album covers for a singer or band, images of movie posters for movies, images of books written by an author, images of queries related to the entity referenced by the knowledge panel, images of the entity itself, images of maps related to the entity, or other types of images. The knowledge modules data store 132 can include several image modules, each with a different arrangement of images. For example, one image module may include placeholders for three images in a row format, while another image module may include placeholders for four images in a column format.

Another example knowledge module is a table module. A table module can include multiple rows and columns for presenting data. For example, a table module may present songs composed by a singer. One column of the table may present the title of the songs, another column may present the album in which the song was included, and yet another column may present the year in which the song was released. The table modules can include a scroll bar that enables users to scroll through the rows and/or the columns of a table module presented by a knowledge panel. Therefore, even if the slot in which the table module is presented does not enable all of the data in the table to be presented simultaneously, the information is still available through the knowledge panel without initiating another request for data and without requiring the user to navigate away from the search results page.

Another example knowledge module is a social module. A social module may present content from a social networking page that references the entity referenced by the knowledge panel. For example, a social module may present a recent post, e.g., text or image post, or a recent update to a person's social networking profile page. If an entity for which a knowledge panel is going to be provided has made a recent update to a social networking page, or if a recent update has received at least a threshold amount of activity, e.g., comments, views, or indications of affinity for the update, then a social module may be included in the knowledge panel to present content related to the update.

Another example knowledge module is an events module. An events module can present information regarding an event, e.g., an upcoming event, associated with the entity referenced by the knowledge panel. For example, if the knowledge panel is for a band that is on tour with a show scheduled near the user that initiated the search, an events module may be included in the knowledge panel. This events module may include the date of the show, the venue at which the show is scheduled and/or a map for the venue, and/or a link to another web page where the user can get additional information or purchase tickets to the show.

Another example knowledge module is a facts module. A facts module can be used to present facts about an entity referenced by a knowledge panel in addition to those included in the standard content items. For example, a facts module for a landmark may include one or more rows, each row including a fact about the landmark.

Another example knowledge module is a related search module. A related search module can present related search content items, such as images or text, for search queries related to the entity referenced by a knowledge panel. For example, the knowledge panel apparatus 130 may identify related entities, search queries that are commonly submitted with a reference to the entity, or other related queries. The related search module can present a content item for one or more of the related queries. Each related search content item presented by the related search module can include a web link for the search query referenced by the related search content item. In response to user interaction with the related search content item, the link can initiate a search for the search query referenced by the related search content item.

Each of the knowledge modules can include web links. For example, each image presented in an image module may include a link to the resource in which the image is published, a resource having more information regarding the subject of the image, or to a search results page for the subject of the image. To illustrate, an image module may include images of books written by a person that is the subject of the knowledge panel. If one of the images is selected, the selection may initiate a search for the book of the selected image.

Knowledge modules can include user interface controls that enable users to access additional content related to the content presented in the knowledge module. In some implementations, a knowledge module may include a tab that, when selected, causes the knowledge module to expand to present additional content. For example, an image module may include a tab that enables users to access additional images related to or similar to the images presented in the image module. In some implementations, knowledge modules may include a link to additional information or content. For example, a facts module may include a link to a resource, such as an online encyclopedia, from which the facts were obtained.

Each content item—or category of content item—stored in the content item data store 134 can have a preferred module type that is indicative of a type of knowledge module or data type that is preferred for presenting the content item. For example, it may be preferred to use an image module to present content items related to movies and albums (e.g., presenting images of posters for the movies or images of album covers for the albums). By way of another example, it may be preferred to present lists of songs by an artist or information about sports team rosters using a table module. Some content items may not have a preferred module type. For these content items, a default knowledge module type, such as a facts module, may be used as the preferred module type. Alternatively, or additionally, the default module type can be selected based on the format of the information presented by the content item. For example, an image module can be selected as the default knowledge module type for a content item that includes mostly image data. For content items that have a preferred knowledge module, a reference to the preferred knowledge module may be stored in the content item data store 134.

As described in more detail below, the knowledge panel apparatus 130 can select content items and knowledge modules to include in a knowledge panel for a particular entity. The selection of knowledge modules can be based on the rank scores for the content items identified for the entity and one or more presentation constraints for the knowledge panel. For example, the knowledge panel may have one or more presentation constraints to ensure that the knowledge panel is consistent, easily scannable by a user, and to keep the content items well prioritized. These presentation constraints, which are also referred to as panel constraints, can be stored in a constraints data store 136.

In some implementations, the presentation constraints specify which knowledge modules can be included in a knowledge panel for a particular entity or entity type, how many of each type of knowledge module can be included in the knowledge panel, and how the knowledge modules are organized within the knowledge panel, to name a few. One example presentation constraint specifies the order in which knowledge modules are displayed within a knowledge panel. For example, this constraint may specify that the knowledge modules are presented from top to bottom within the knowledge panel in the following order: facts→table modules→upcoming events modules→social modules→image modules→related search modules.

Another example presentation constraint for specifying the order of knowledge modules may specify that text-based knowledge modules are presented above any knowledge modules that include an image. For example, this constraint may be used to prevent the knowledge panel from having alternating rows of text and images.

Another example presentation constraint may specify the order in which categories of content items are presented in the knowledge panel. For example, this constraint may specify that related queries or query refinements always be displayed at the bottom of the knowledge panel, while facts are presented near the top of the knowledge panel.

Another example presentation constraint limits the number of each type of knowledge module that is included in a set of knowledge modules that are in the knowledge panel. For example, this constraint may specify that no more than three image modules (e.g., modules that include an image) can be presented in a knowledge panel. In this example, if the preferred knowledge module for more than three types of content items identified for the knowledge panel is an image module, then three of the types of content items may be presented using an image module, while the other types of content items are presented using an alternative knowledge module, or are not presented in the knowledge panel.

Another example presentation constraint specifies the total number of knowledge panels and/or facts presented in a knowledge panel. For example, this constraint may specify that no more than a total of seven facts and/or knowledge modules be included in a single knowledge panel. In this example, if five facts are selected to be included in the knowledge panel, two knowledge modules will be selected for the knowledge panel. The number of facts and/or knowledge panels can be selected, for example, on the rank scores for the facts and/or the content items that will be presented in the knowledge panels. For example, if a highest ranking set of seven content items can be selected based on the rank scores, five of these content items may be facts, one of the content items may be an image of an album cover, and another of the content items may be an image of a movie poster. Thus, in this example, the knowledge panel may include the five facts, an image module that presents the album cover (and possibly other relevant album covers), and another image module that presents the image of the movie poster (and possibly other relevant movie posters).

Figure 2:
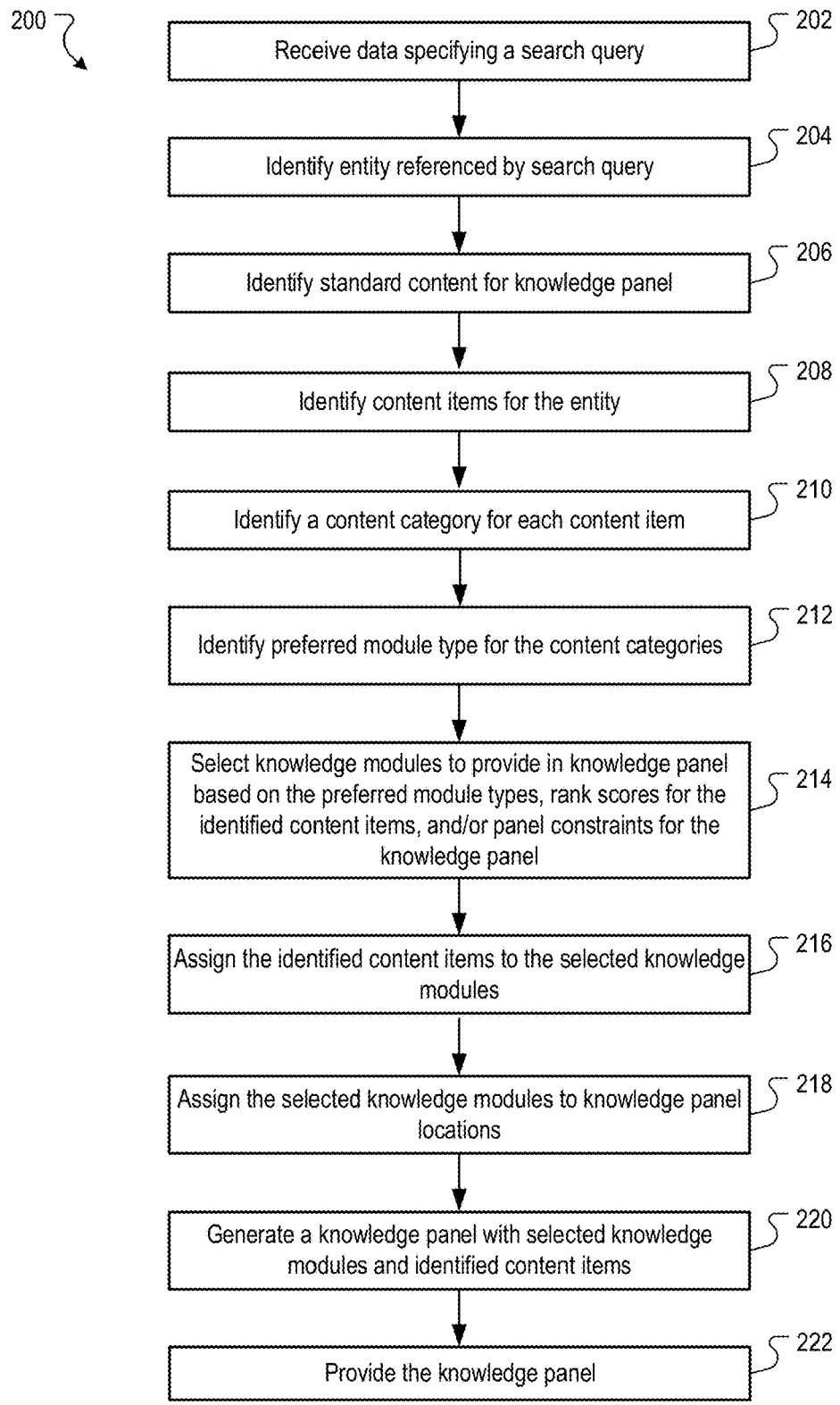
FIG. 2 is a flow chart of an example process for providing a knowledge panel for a particular entity.

FIG. 2 is a flow chart of an example process 200 for providing a knowledge panel for a particular entity. The process 200 can be implemented, for example, by the knowledge panel apparatus 130. In some implementations, the process 200 can also be implemented as instructions stored on computer storage medium, and execution of the instructions by a data processing apparatus cause the data processing apparatus to perform the operations of this process 200.

Query data specifying a search query is received (202). For example, the knowledge panel apparatus 130 may receive the search query data from the search system 120, which may have received the query from a user device 106 that submitted the search query.

An entity referenced by the search query is identified (204). For example, the knowledge panel apparatus 130 may identify the entity by comparing text included in the search query to search queries that have been deemed to reference a set of known entities. In some implementations, the set of known entities—and any aliases for the known entities—is stored in the content item data store 134 with a reference to the search queries (or other data) that have been deemed to reference the known entities. For example, assume that "Ima Singer" is the name of a famous singer, and that the famous singer's stage name is "Magnificent". In this example, a reference to the famous singer in the data store 134 can include a reference to both "Ima Singer" and "Magnificent", such that the famous singer is identified as the entity being referenced by search queries that match either of those names. The knowledge panel apparatus 130 can compare the text of the search query to each known entity and their aliases to identify any entities that are referenced in the search query.

Standard content items for the knowledge panel are identified (206). In some implementations, a knowledge panel may include standard content for each entity or each type of entity. For example, each knowledge panel may include a title, a canonical image for the entity, a description of the entity, and one or more facts about the entity. The knowledge panel apparatus 130 can identify each of the standard content items for each entity and store the standard content for each entity in the content item data store 134. When a knowledge panel is to be generated for the entity, the knowledge panel apparatus 130 can access the content item data store 134 to obtain the standard content items.

The standard content items may also be identified at query time. For example, the knowledge panel apparatus 130 may identify an image, description, and facts about the entity from images, descriptions, and facts about the entity stored in the content items data store 134. Each of these content items may have a rank score and the knowledge panel apparatus 130 may select the standard content items from available content items based on the ranks scores.

Additional content items are identified for the entity (208). The identified content items are content items that have been identified as being relevant to the entity. For example, the knowledge panel apparatus 130 may access the content item data store 134 to identify content items that are relevant to an entity. As described above, the content item data store 134 may include, for each content item, a reference to the entities to which the content item is related.

In some implementations, each content item that is relevant to the entity includes a rank score that indicates the relevance and/or popularity of the content item to the entity. For example, a content item having a rank score that is greater than the rank score of another content item may be considered more relevant to the entity than the other content item. The knowledge panel apparatus 130 can use the rank scores to identify a proper subset of the content items having higher rank scores. For example, the knowledge panel apparatus 130 may identify a certain number of content items as candidate content items for the knowledge panel based on the rank scores.

A content category is identified for each identified content item (210). For example, the knowledge panel apparatus 130 may identify a content category to which each identified content item has been classified. In general, the content categories are used to classify content items directed to the same or similar types of entities. For example, there may be a content category for each of movies, people, actors, singers, bands, authors, songs, albums, television shows, maps, events, social networking posts, facts, related queries, query refinements, and other query interpretations, to name a few. A song recorded by a singer may be classified in the "song" category, while the album that includes the song may be classified in the "album" category. In some implementations, the content category can also be indicative of a type of content that is included in the content item. For example, an image content category can be used to identify content items that are image files. The content category for each content item may be referenced in the content item data store 134.

A preferred module type is identified for each of the identified content items (212). In some implementations, a system designer or administrator may assign each content item or category of content item a preferred module type. For example, a system administrator may assign the image module as the preferred module type for content items classified in the movie category. In this example, movie content items identified for an actor will typically be presented in the form of images in an image module of a knowledge panel. The preferred module type for a content item or category of content items can be selected based on the representation of that category of content that is suitable for presenting information about the content item, for example, based on the presence or absence of images in the content items, and/or the overall desired prominence of the content items.

Knowledge modules are selected for the knowledge panel (214). In some implementations, the knowledge panel apparatus 130 selects the knowledge modules based, at least in part, on the rank scores for the identified content items and the identified content categories for the identified content items. In some implementations, the knowledge panel apparatus 130 also considers one or more panel constraints for the knowledge panel to determine which knowledge modules to present the identified content.

For example, the knowledge panel apparatus 130 may be configured to attempt to present each identified content item in the preferred knowledge module for that identified content item, subject to one or more panel constraints for the knowledge panels. Without these constraints, each identified content item may be presented in its preferred knowledge module. However, the quality of presentation and the consistency of the knowledge panels from one entity to the next may be reduced without the constraints. For example, without constraints, each content item may be displayed using images, resulting in a knowledge panel with only images.

In some implementations, panel constraints limit the number of knowledge modules of a particular module type that are allowed to be included in the knowledge panel. Therefore, when selecting the knowledge modules, a determination may be made whether each of the content items can be assigned to their respective preferred module types without violating the panel constraints. For example, a determination can be made whether selection of a same particular module type for two or more different content categories will exceed the maximum number of knowledge modules of that type that are allowed to be included in the knowledge panel. If the maximum number is not exceeded, then the knowledge panel apparatus 130 can select the same module type for each of the different content categories. However, if the maximum number will be exceeded, the particular module type may be selected for only a proper subset (e.g., only one or at least one fewer than all of the two or more) of the content In some implementations, the knowledge panel apparatus 130 selects the knowledge modules for the knowledge panel based on the rank scores for the identified content items. For example, a panel constraint may limit the number of image modules to no more than three. If four categories of content items identified for the entity are assigned the image module as their preferred knowledge module, then the content items for one of the categories may be presented in another type of knowledge module or excluded from the knowledge panel. In some implementations, the content category having content items with the lowest rank scores is assigned to another type of knowledge module or excluded while the content category of content items having content items with the highest rank scores is assigned to the preferred knowledge module for the content category. Thus, the set of knowledge modules that are selected for presentation in the knowledge panel can include at least two different knowledge module types.

In some implementations, the knowledge panel apparatus 130 considers the rank scores for each content item in each content category to determine which content category will be assigned to its preferred knowledge panel. For example, if a content category has multiple content items that have been identified for the entity, the knowledge panel may combine, e.g., by summing, averaging, etc., the rank scores for each content item classified in the content category to determine an overall score for the content category. An overall score may be similarly determined for each other content category that shares the same preferred knowledge module. The knowledge panel apparatus may then compare the overall scores to determine which content category or categories will have their content items presented in the preferred knowledge module. For example, the content category having the highest overall score may be assigned to its preferred module type, while other content categories may be assigned a different knowledge module type. Thus, analysis of the panel constraints and the rank scores can facilitate a determination that fewer than all of the content categories will be assigned their respective preferred module type. For example, only one of multiple different content categories may be assigned a particular knowledge panel type, even if each of the preferred module type for each of the multiple different content categories is the same.

In some implementations, the knowledge panel apparatus 130 considers the rank score for the content item having the highest rank score in each content category to determine which content category will be assigned to its preferred knowledge panel. For example, if the highest rank score for content items in the "song" content category is 100, while the highest rank score for a content item in the "albums" content category is 90, then the "songs" content category may be assigned to its preferred knowledge module before the "albums" content category.

In some implementations, the number of content items for each content category represented by the identified content items is used to select knowledge module and assign content categories to knowledge modules. For example, the knowledge panel apparatus 130 may compare the number of content items identified for a particular content category to a threshold number of content items required for the preferred knowledge module for that content category. If the number of identified content items satisfies, e.g., exceeds, the threshold, then the preferred knowledge module may be selected for the content items of that content category. If the number of identified content items does not satisfy the threshold, then an alternative knowledge module may be selected for that content category. Consider for example that the threshold number of images required for an image module is three. If the preferred knowledge module for a content category is the image module, but there are only two images in the identified content items for the content category, the knowledge panel apparatus 130 may select a different knowledge module for those content items. For example, the knowledge panel apparatus 130 may select a facts module or table module to present the content items for that content category.

If one or more content categories are assigned to a non-preferred knowledge module, the knowledge panel apparatus 130 may select a knowledge module for the content category. For example, the knowledge panel apparatus 130 may select a default knowledge module, such as a facts module, to present the content items for that content category. Continuing the previous example with a limit of three image modules, if there are four content categories represented by the identified content items and all four have the image module as their preferred module, then the knowledge module may select three image modules and one facts module for the knowledge panel.

The identified content items are assigned to the selected knowledge modules (216). For example, the knowledge panel apparatus 130 may assign each identified content item or a portion of the identified content items to the selected knowledge modules.

In some implementations, the content items are assigned to the selected knowledge modules based on the content category to which the content items are assigned. For example, the knowledge panel apparatus 130 may select a knowledge module for each content category as described above. The knowledge panel apparatus 130 may then assign at least a portion of the identified content items for each content category to the knowledge module for the content category. If the knowledge module has a limited number of placeholders for content items, such as an image module having a row for five images, then the knowledge panel apparatus 130 may assign the content items having the highest rank scores to the knowledge module. The content items having lower rank scores may be excluded from the knowledge panel or included for presentation in response to user interaction with a user interface element that requests additional content. For example, user interaction with a scroll bar or a user interface element that causes expansion of the knowledge module may cause presentation of additional content items beyond those initially displayed.

As described above, the content item data store 134 can include content items that have been obtained from different resources and/or publishers. Thus, one or more of the knowledge modules may include content items obtained from different resources and/or publishers. For example, one of the knowledge modules may include two or more content items that were provided or otherwise obtained from two or more different publishers.

The selected knowledge modules are assigned to knowledge panel locations (218). In some implementations, the knowledge panel apparatus 130 assigns the knowledge modules to knowledge panel locations based on the rank scores for the identified content items assigned to each knowledge panel and/or based on one or more presentation constraints for the knowledge panel.

In some implementations, the one or more presentation constraints specify an order for the each type of knowledge module within the knowledge panel. The knowledge panel apparatus 130 can assign the knowledge modules to respective knowledge panel locations in accordance with the specified order. For example, the one or more constraints may specify that image modules are presented at the bottom of the knowledge panel. In such an example, if one or more image modules were selected, then the knowledge panel apparatus may assign the image module(s) to knowledge panel locations at the bottom of the knowledge panel.

If there are multiple knowledge modules of the same type that have been selected, e.g., two or more image modules, then the multiple knowledge modules may be assigned to knowledge panel locations based on the rank scores for the identified content items assigned to the knowledge modules. For example, if the one or more constraints specify that image modules are to be presented at the bottom of the knowledge panel and there are two image modules selected, then one of the image modules may be presented in the bottom knowledge panel location and the other image module may be presented in the knowledge panel location directly above the bottom knowledge panel location. The knowledge panel apparatus 130 can determine which image module to assign to each knowledge panel location based on the ranks scores for the content items assigned to each image module. For example, the image module having content items with higher rank scores than the content items of the other image module may be placed in the higher knowledge panel location.

In some implementations, the knowledge panel apparatus 130 selects the knowledge modules and/or content items for entities using an offline process, for example periodically. In some implementations, the knowledge panel apparatus 130 selects the knowledge modules and/or content items for an entity at query time after receiving a query referencing the entity. By selecting the knowledge modules and content items at query time, the knowledge panel can present up to date content items and content items that are more relevant at the time, such as content items related to upcoming events.

The knowledge panel is generated with the standard content and the selected knowledge modules (220). For example, the knowledge panel apparatus 130 may populate a knowledge panel template with the standard content and the knowledge modules with the identified content that has been assigned to the knowledge modules.

The generated knowledge panel is provided (222). For example, the knowledge panel apparatus 130 may provide the generated knowledge panel to the search system 120. In turn, the search system 120 may provide the knowledge panel to a user device 106 that submitted the search query for presentation on a search results page.

Figure 3:
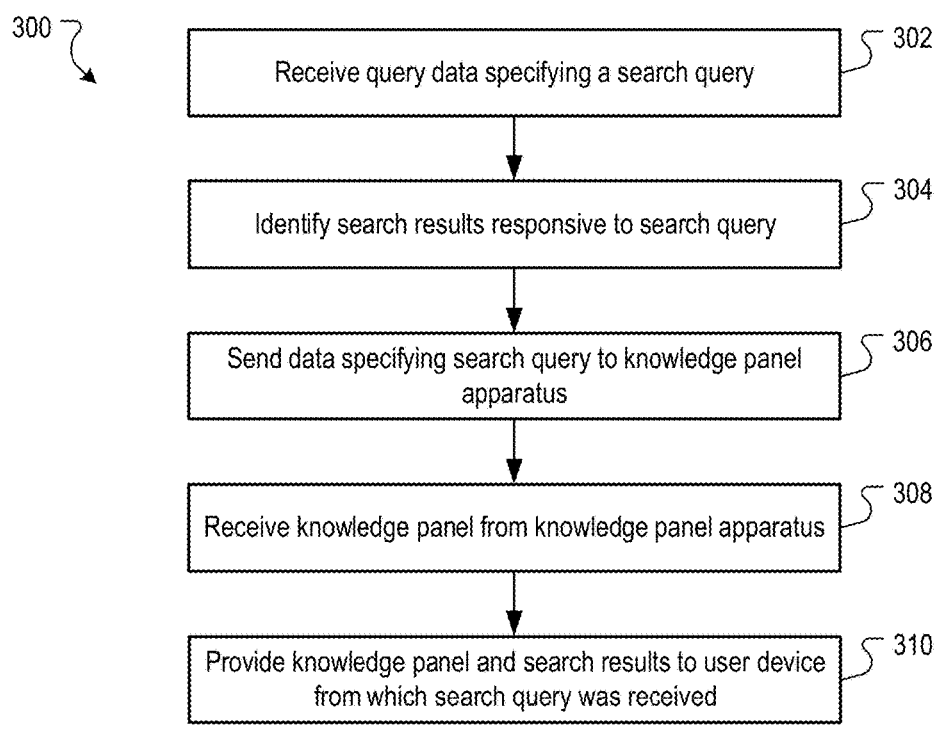
FIG. 3 is a flow chart of an example process for providing a knowledge panel with search results for a search query.

FIG. 3 is a flow chart of an example process 300 for providing a knowledge panel with search results for a search query. The process 300 can be implemented, for example, by the search system 120. The process 300 can also be implemented as instructions stored on computer storage medium, and execution of the instructions by a data processing apparatus cause the data processing apparatus to perform the operations of this process 300.

Query data specifying a search query is received (302). For example, the search system 120 may receive the search query data from a user device 106. Search results 111 responsive to the received search query 109 are identified (304). For example, the search system 120 may access the search index 122 to identify search results 111 that are responsive to the received search query 109.

Data specifying the search query 109 is sent to the knowledge panel apparatus 130 (306). For example, the search system 120 may send the data to the knowledge panel apparatus 130. In some implementations, rather than send the search query 109 to the knowledge panel apparatus 130, the search system 120 may identify an entity referenced by the search query 109. Based on the identified entity, the search system 120 may determine whether to provide a knowledge panel with or in place of the search results 111. If the search system determines to provide a knowledge panel, the search system 120 can request a knowledge panel from the knowledge panel apparatus 130 and provide the identified entity or the search query 109 to the knowledge panel apparatus 130.

A knowledge panel is received from the knowledge panel apparatus 130 (308). For example, the knowledge panel apparatus 130 may identify content items to include in a knowledge panel for an entity referenced by the search query 109, generate a knowledge panel with the identified content, and provide the generated knowledge panel to the search system 120.

The knowledge panel and the identified search results are provided to the user device 106 that submitted the search query 109 (310). For example, the search system 120 may provide a search results page that presents the knowledge panel and the identified search results. In some implementations, the knowledge panel and the search results are provided asynchronously.

In some implementations, the search system 120 provides, to the user device 106, data that cause the user device 106 to present the knowledge panel and the search results. This data can also include data that causes the user device 106 to present content items identified for the knowledge panel in knowledge modules selected for the knowledge panel. The user device 106 can use the received data to render the knowledge panel and the search results, for example on a search results page or other search interface.

Figure 4:
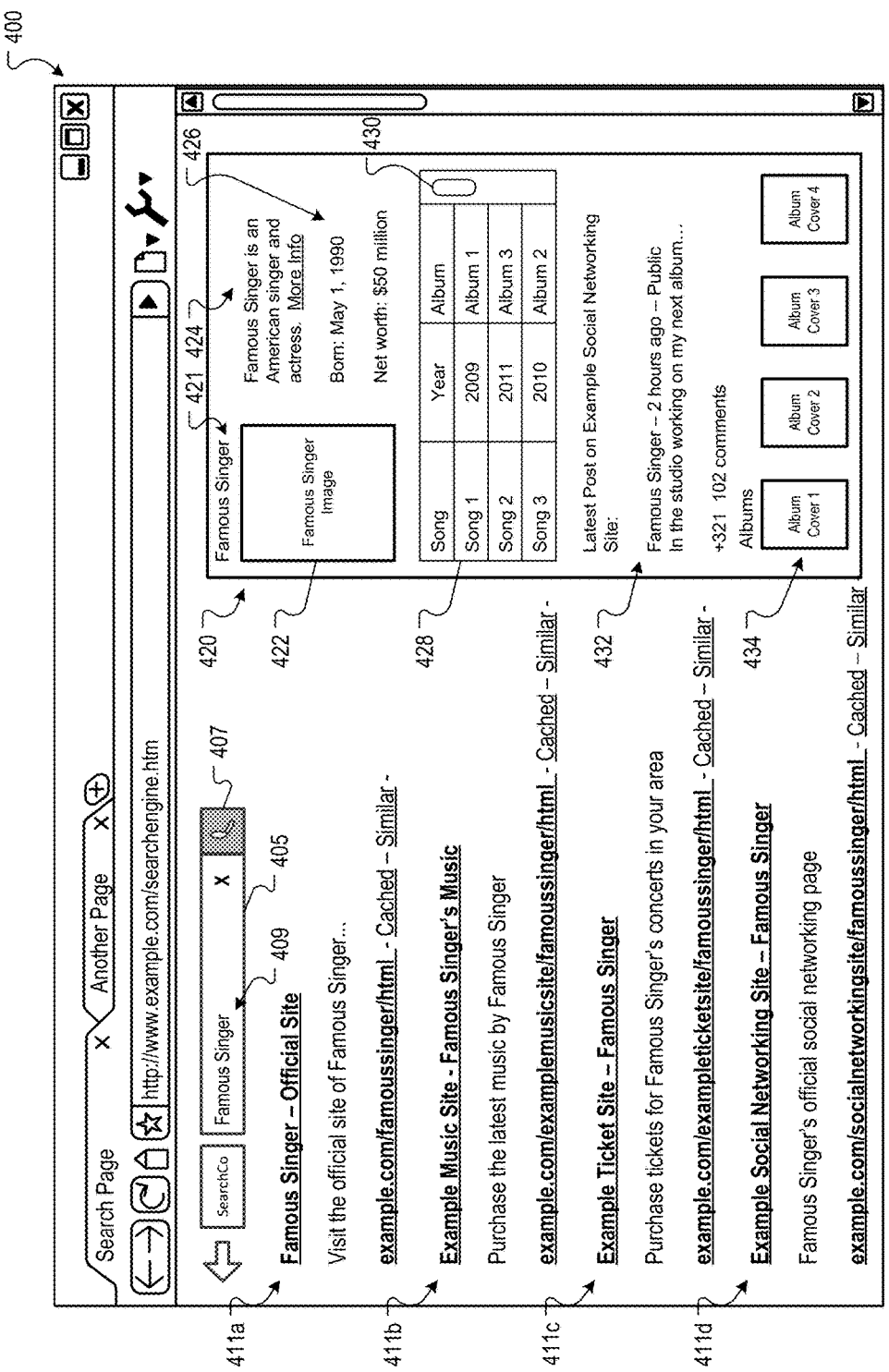
FIG. 4 is a screen shot of an example search interface in which a knowledge panel is presented.

FIG. 4 is a screen shot of an example search interface 400 in which a knowledge panel 420 is presented. The search interface 400 can be presented at a user device 106 and includes a query entry field 405 in which a user can enter a search query 409. The search interface 400 also includes a query initiation element 407 with which the search query 409 can be submitted to the search system 120. For example, in response to user interaction with the search initiation element 407, the user device 106 can submit a search query to the search system 120.

The search interface 400 also includes a knowledge panel 420 and search results 411*a*-411*d*. In this example search interface 400, the knowledge panel 420 and the search results 411a-411d have been received in response to the submission of the search query "Famous Singer." Although one knowledge panel 420 and four search results 411a-411d are illustrated in this example search interface 400, other numbers of knowledge panels and search results can be presented by a search interface.

In this example search interface 400, the knowledge panel 420 is presented on the right side of the search interface 400 and adjacent to the search results 411a-411d. In other search interfaces, the knowledge panel 420 may be presented on the left side of the search interface 400, at the top of the search interface 400, at the bottom of the search interface 400, or inline with the search results 411a-411d.

The example knowledge panel 420 includes a title 421, an image 422 of Famous Singer, a description 424 of Famous Singer, and facts 426 about Famous Singer. The facts 426 include the year that Famous Singer was born and the net worth of Famous Singer. Other facts about Famous Singer could also be shown in addition to or in place of those shown depending on the availability of the facts and the relevance and/or popularity of the facts. For example, if a particular fact, such as the birthplace of Famous Singer is referenced in more search queries (or user requested pages) than the net worth of Famous Singer, the birthplace may be considered more popular than the net worth and displayed as a fact in place of the net worth.

The knowledge panel 420 also includes several knowledge modules 428, 432, and 434. In particular, the knowledge panel 420 includes a table module 428 that presents information regarding songs recorded by Famous Singer. For example, the table includes the title, year of release, and the album on which each of the songs were released. The example table module 428 also includes a scroll bar 430. The scroll bar 430 enables a user to view additional information in the table 428. For example, if the user drags the scroll bar down, the user device 106 will display lower rows of the table that are not currently in view.

The data in the lower rows may be provided to the user device at the same time or at about the same time as the knowledge panel 420 for example in response to the search query. In this way, the data on the lower rows can be displayed without initiating another request to a search system or other resource.

The knowledge panel 420 also includes a social module 432. The example social module 432 includes a recent post that has been posted on a social networking page of Famous Singer. The social module 432 also includes a count of the number of social networking users that have expressed an affinity for the post (+321) and a count of the number of comments that have been posted in response to the social networking post. This content can be obtained from Famous Singer's social networking page, for example, if the social networking page is public.

In some implementations, a social module is presented in a knowledge panel if there have been an update to a social networking page of the entity referenced by the knowledge panel within a threshold amount of time. In some implementations, a social module is presented in a knowledge panel if a social networking page update or post has received at least a threshold amount of activity, such as views, comments, or +1's.

The knowledge panel 420 also includes an image module 434 that presents images of albums released by Famous Singer. This example image module 434 includes a row of four images. Other image modules may include images arranged in columns or other number of images.

Figure 5:
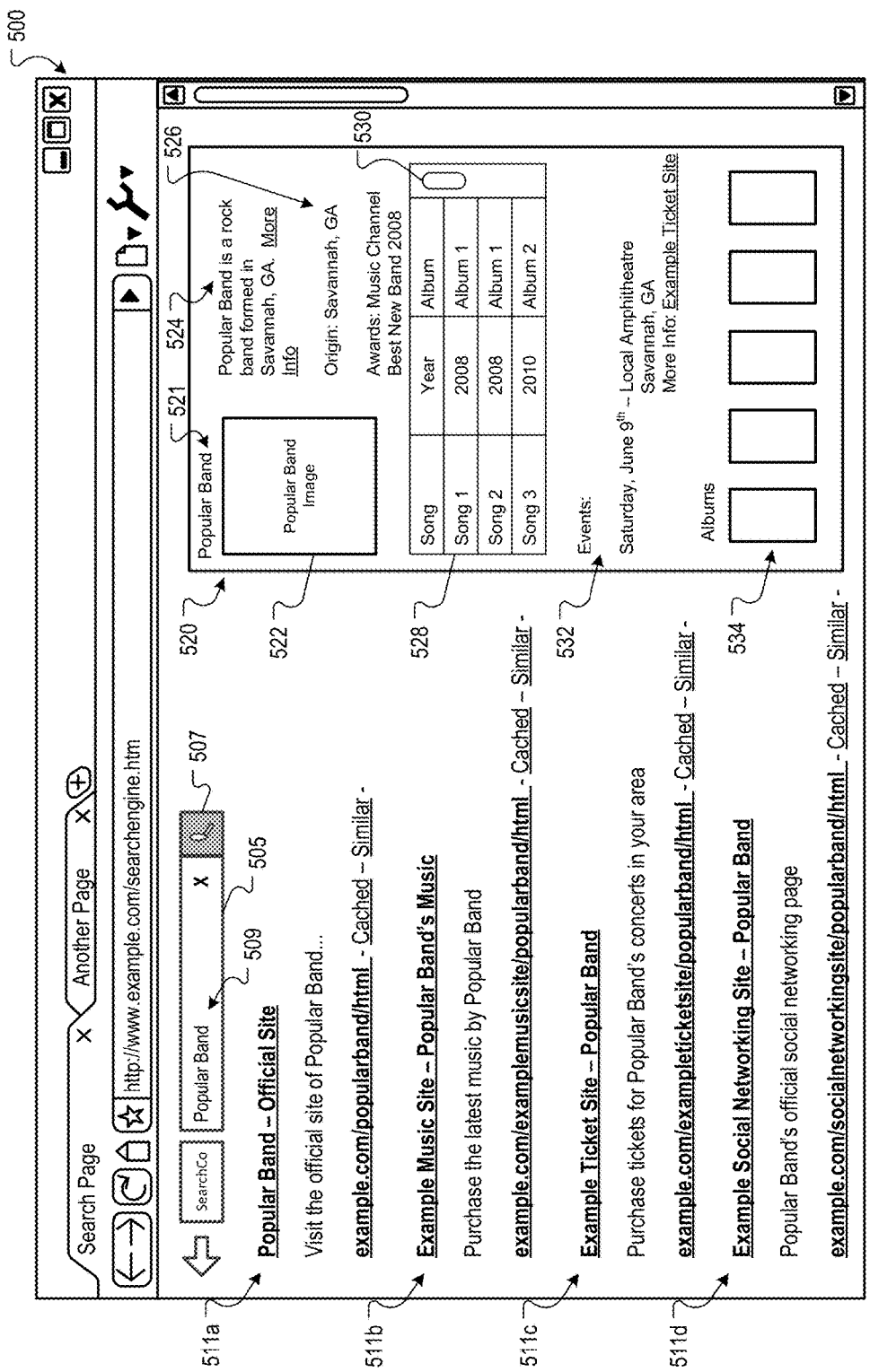
FIG. 5 is a screen shot of another example search interface in which a knowledge panel is presented.

FIG. 5 is a screen shot of another example search interface 500 in which a knowledge panel 520 is presented. Similar to the search interface 400 of FIG. 4, the search interface 500 includes a query entry field 505 in which a user can enter a search query 509 and a query initiation element 507 with which a search query 509 can be submitted to the search system 120. The example search interface 500 also includes a knowledge panel 520 and search results 511a-511d. In this example search interface 500, the knowledge panel 520 and the search results 511a-511d have been received from a search system, such as the search system 120, in response to the submission of the search query "Popular Band."

The example knowledge panel 520 includes a title 521, an image 522 of Popular Band, a description 524 of Popular Band, and facts 526 about Popular Band. The facts 526 about Popular Band include the location of origin of Popular Band and awards that Popular Band has received.

The knowledge panel 520 also includes several knowledge modules. In particular, the knowledge panel 520 includes a table module 528 that presents information regarding songs recorded by Popular Band. For example, the table module 528 includes the title, year of release, and the album on which each of the songs were released. The example table module 528 also includes a scroll bar 530 similar to that included in the table module 428 of FIG. 4.

The knowledge panel 520 also includes an events module 532 that includes information for an upcoming show scheduled for Popular Band. In particular, the event module 532 presents the date of the show, the venue for the show, and the city at which the show is scheduled. The events module 532 also includes a link to a ticket web site where the user can obtain additional information regarding the upcoming show or purchase tickets for the show.

The knowledge panel 520 also includes an image module 534 that presents images of albums released by Popular Band. This example image module 534 includes a row of five images.

Figure 6:
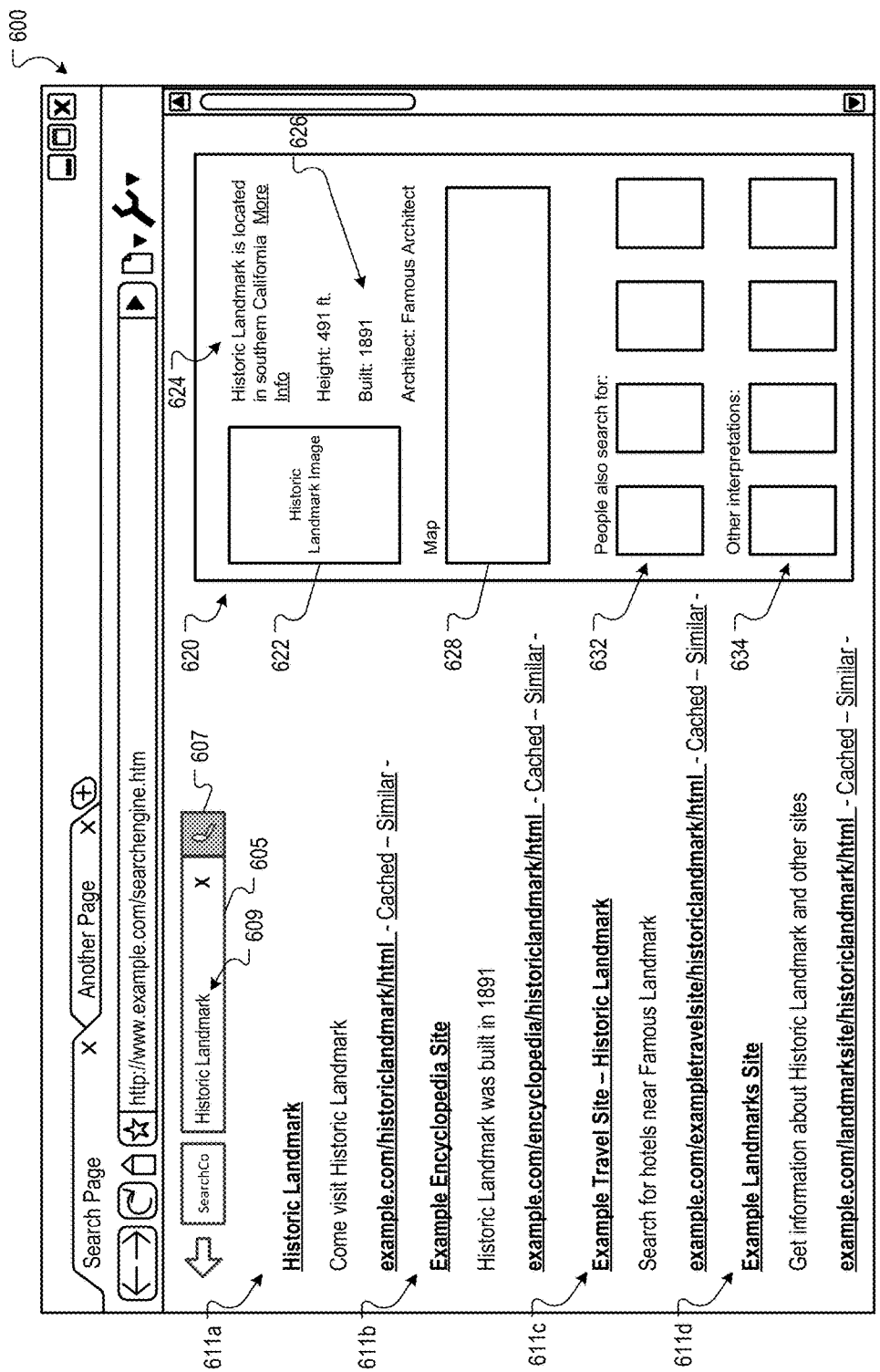
FIG. 6 is a screen shot of another example search interface in which a knowledge panel is presented.

FIG. 6 is a screen shot of another example search interface 600 in which a knowledge panel 620 is presented. Similar to the search interface 400, the search interface 600 includes a query entry field 605 in which a user can enter a search query 609 and a query initiation element 607 with which a search query 609 can be submitted to the search system 120. The example search interface 600 also includes a knowledge panel 620 and search results 611a-611d. In this example search interface 600, the knowledge panel 620 and the search results 611a-611d have been received from a search system, such as the search system 120, in response to the submission of the search query "Historic Landmark."

The example knowledge panel 620 includes a title 621, an image 622 of Historic Landmark, a description 624 of Historic Landmark, and facts 626 about Famous Landmark. The facts about Popular Landmark include the height of Historic Landmark, the year Historic Landmark was built, and the architect that designed Historic Landmark.

The knowledge panel 620 also includes several knowledge modules. In particular, the knowledge panel 620 includes a map module 628 that displays a map of the area around Historic Landmark. The knowledge panel 620 also includes an image module 632 that includes images for other entities for which users that submitted search queries for Historic Landmark also submitted search queries. For example, these images may include images for other landmarks or other entities near Famous Landmark.

The knowledge panel 620 also includes an image module 634 that includes images of other entities deemed to be possible interpretations of the search query "Historic Landmark." For example, the images may include images of other landmarks or other entities having the same or similar names as Historic Landmark.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   identifying an entity that is referenced by a received search query;
   identifying a plurality of content items that have been identified as relevant to the entity, each content item being (i) classified to a content category and (ii) assigned a rank score based on relevance of the content item to the entity;
   selecting, from a plurality of knowledge modules, a set of knowledge modules to be presented in a knowledge panel for the entity, the knowledge panel (i) being an area of a search results page in which content related to the entity is presented separate from a listing of search results for the received search query and (ii) including presentation space in which knowledge modules are presented in different arrangements including different types of knowledge modules being presented in different orders for different entities based on relevance of content items in the knowledge modules to the entities, wherein:
      each knowledge module in the plurality of knowledge modules presents a plurality of content items of a same category of content items;
      the set of knowledge modules includes at least two different knowledge module types that each presents a different category of content items;
      the selection of knowledge modules to be presented in the knowledge panel for the entity is based, at least in part, on the rank scores for the identified content items classified to the content categories of each of the knowledge modules in the plurality of knowledge modules, wherein the set of knowledge modules include:
         a first knowledge module, of a first type, that presents a first category of content items; and
         a second knowledge module, of a second type different from the first type, that presents a second category of content items different from the first category of content items;
   determining, based on a combination of the rank scores for two or more content items assigned to each knowledge module, an order in which the set of knowledge modules are to be presented in the knowledge panel;
   positioning the set of knowledge modules within the knowledge panel in the determined order for the set of knowledge modules; and
   providing, to a user device, the knowledge panel including the set of knowledge modules positioned in the determined order for the set of knowledge modules, the knowledge panel being presented with the search results page for the received search query.

2. The method of claim 1, wherein the first knowledge module presents the first category of content items in a first data format and the second knowledge module presents the second category of content items in a second data format different from the first data format.

3. The method of claim 1, further comprising determining, for a given knowledge module of the set of knowledge modules, an order in which two or more content items assigned to the given knowledge module are to be presented in the given knowledge module based on the rank score for each of the two or more content items assigned to the given knowledge module.

4. The method of claim 1, further comprising determining the rank score for a given content item based on a number of received search queries that reference content presented by the content item.

5. The method of claim 1, wherein the knowledge panel includes one or more standard types of content items that are presented in a same location within the knowledge panel irrespective of the order in which the set of knowledge panels are presented.

6. The method of claim 1, wherein selecting a set of knowledge modules to be presented in a knowledge panel for the entity comprises:

identifying a set of one or more presentation constraints for the knowledge panel;

determining, based on the one or more presentation constraints, that the first category of content items and the second category of content items cannot both be presented in a same preferred type of knowledge module; and determining, based on a combination of rank scores for two or more content items of the first category of content items being greater than a combination of rank scores for two or more content items of the second category of content items, that the first category of contents will be presented in the preferred type of knowledge module and that the second category of content items will be presented in a different type of knowledge module.

7. The method of claim 1, wherein a particular knowledge module of the set of knowledge modules includes a particular content item that includes (i) content related to a particular entity and (ii) a link that initiates a search directed to the particular entity in response to user interaction with the particular content item.

8. The method of claim 1, wherein at least one knowledge module in the set of knowledge modules includes a user interface control that presents additional content items related to the entity without navigating away from the search results page.

9. A system, comprising:
a data processing apparatus; and
a computer storage medium encoded with a computer program, the program comprising data processing apparatus instructions that when executed by the data processing apparatus cause the data processing apparatus to perform operations comprising:
identifying an entity that is referenced by a received search query;
identifying a plurality of content items that have been identified as relevant to the entity, each content item being (i) classified to a content category and (ii) assigned a rank score based on relevance of the content item to the entity;
selecting, from a plurality of knowledge modules, a set of knowledge modules to be presented in a knowledge panel for the entity, the knowledge panel (i) being an area of a search results page in which content related to the entity is presented separate from a listing of search results for the received search query and (ii) including presentation space in which knowledge modules are presented in different arrangements including different types of knowledge modules being presented in different orders for different entities based on relevance of content items in the knowledge modules to the entities, wherein:
each knowledge module in the plurality of knowledge modules presents a plurality of content items of a same category of content items;
the set of knowledge modules includes at least two different knowledge module types that each presents a different category of content items;
the selection of knowledge modules to be presented in the knowledge panel for the entity is based, at least in part, on the rank scores for the identified content items classified to the content categories of each of the knowledge modules in the plurality of knowledge modules, wherein the set of knowledge modules include:
a first knowledge module, of a first type, that presents a first category of content items; and
a second knowledge module, of a second type different from the first type, that presents a second category of content items different from the first category of content items;
determining, based on a combination of the rank scores for two or more content items assigned to each knowledge module, an order in which the set of knowledge modules are to be presented in the knowledge panel;
positioning the set of knowledge modules within the knowledge panel in the determined order for the set of knowledge modules; and
providing, to a user device, the knowledge panel including the set of knowledge modules positioned in the determined order for the set of knowledge modules, the knowledge panel being presented with the search results page for the received search query.

10. The system of claim 9, wherein the first knowledge module presents the first category of content items in a first data format and the second knowledge module presents the second category of content items in a second data format different from the first data format.

11. The system of claim 9, wherein the operations comprise determining, for a given knowledge module of the set of knowledge modules, an order in which two or more content items assigned to the given knowledge module are to be presented in the given knowledge module based on the rank score for each of the two or more content items assigned to the given knowledge module.

12. The system of claim 9, wherein the operations comprise determining the rank score for a given content item based on a number of received search queries that reference content presented by the content item.

13. The system of claim 9, wherein the knowledge panel includes one or more standard types of content items that are presented in a same location within the knowledge panel irrespective of the order in which the set of knowledge panels are presented.

14. The system of claim 9, wherein selecting a set of knowledge modules to be presented in a knowledge panel for the entity comprises:
identifying a set of one or more presentation constraints for the knowledge panel;
determining, based on the one or more presentation constraints, that the first category of content items and the second category of content items cannot both be presented in a same preferred type of knowledge module; and
determining, based on a combination of rank scores for two or more content items of the first category of content items being greater than a combination of rank scores for two or more content items of the second category of content items, that the first category of contents will be presented in the preferred type of knowledge module and that the second category of content items will be presented in a different type of knowledge module.

15. The system of claim 9, wherein a particular knowledge module of the set of knowledge modules includes a particular content item that includes (i) content related to a particular entity and (ii) a link that initiates a search directed to the particular entity in response to user interaction with the particular content item.

16. A non-transitory computer storage medium encoded with a computer program, the program comprising instructions that when executed by data processing apparatus cause the data processing apparatus to perform operations comprising:

identifying an entity that is referenced by a received search query;
  identifying a plurality of content items that have been identified as relevant to the entity, each content item being (i) classified to a content category and (ii) assigned a rank score based on relevance of the content item to the entity;
  selecting, from a plurality of knowledge modules, a set of knowledge modules to be presented in a knowledge panel for the entity, the knowledge panel (i) being an area of a search results page in which content related to the entity is presented separate from a listing of search results for the received search query and (ii) including presentation space in which knowledge modules are presented in different arrangements including different types of knowledge modules being presented in different orders for different entities based on relevance of content items in the knowledge modules to the entities, wherein:
    each knowledge module in the plurality of knowledge modules presents a plurality of content items of a same category of content items;
    the set of knowledge modules includes at least two different knowledge module types that each presents a different category of content items;
    the selection of knowledge modules to be presented in the knowledge panel for the entity is based, at least in part, on the rank scores for the identified content items classified to the content categories of each of the knowledge modules in the plurality of knowledge modules, wherein the set of knowledge modules include:
      a first knowledge module, of a first type, that presents a first category of content items; and
      a second knowledge module, of a second type different from the first type, that presents a second category of content items different from the first category of content items;
  determining, based on a combination of the rank scores for two or more content items assigned to each knowledge module, an order in which the set of knowledge modules are to be presented in the knowledge panel;
  positioning the set of knowledge modules within the knowledge panel in the determined order for the set of knowledge modules; and
  providing, to a user device, the knowledge panel including the set of knowledge modules positioned in the determined order for the set of knowledge modules, the knowledge panel being presented with the search results page for the received search query.

17. The non-transitory computer storage medium of claim 16, wherein the first knowledge module presents the first category of content items in a first data format and the second knowledge module presents the second category of content items in a second data format different from the first data format.

18. The non-transitory computer storage medium of claim 16, wherein the operations comprise determining, for a given knowledge module of the set of knowledge modules, an order in which two or more content items assigned to the given knowledge module are to be presented in the given knowledge module based on the rank score for each of the two or more content items assigned to the given knowledge module.

19. The non-transitory computer storage medium of claim 16, wherein the operations comprise determining the rank score for a given content item based on a number of received search queries that reference content presented by the content item.

20. The non-transitory computer storage medium of claim 16, wherein the knowledge panel includes one or more standard types of content items that are presented in a same location within the knowledge panel irrespective of the order in which the set of knowledge panels are presented.

* * * * *